United States Patent [19]

Koehler et al.

[11] Patent Number: 4,996,259
[45] Date of Patent: Feb. 26, 1991

[54] PREPARATION OF AQUEOUS SYNTHETIC WAX DISPERSIONS

[75] Inventors: Gernot Koehler, Worms; Juergen Schmidt-Thuemmes, Ludwigshafen; Norbert Hasenbein, Dirmstein; Lothar Schlemmer, Maxdorf; Wolfram Dietsche, Frankenthal, all of Fed. Rep. of Germany

[73] Assignee: BASF Aktiengesellschaft, Ludwigshafen, Fed. Rep. of Germany

[21] Appl. No.: 397,879

[22] Filed: Aug. 23, 1989

[30] Foreign Application Priority Data

Sep. 8, 1988 [DE] Fed. Rep. of Germany ....... 3830535

[51] Int. Cl.$^5$ ...................... C08J 3/02; C08L 23/00; C08L 91/00
[52] U.S. Cl. .................................... 524/276; 524/275; 524/487; 524/489; 524/556; 524/559
[58] Field of Search ............... 524/275, 487, 489, 276, 524/556, 559

[56] References Cited

U.S. PATENT DOCUMENTS

| | | | |
|---|---|---|---|
| 4,320,041 | 3/1982 | Abe et al. ............................. | 524/503 |
| 4,693,909 | 9/1987 | Ziegler et al. ....................... | 106/271 |

FOREIGN PATENT DOCUMENTS

| | | |
|---|---|---|
| 3512564 | 9/1987 | Fed. Rep. of Germany. |
| 3420168 | 6/1988 | Fed. Rep. of Germany. |

OTHER PUBLICATIONS

Database Chemical Abstracts, vol. 103, No. 16, 1985, abstract nr. 124803d, Columbus, Ohio, U.S.
Rompps Chemie-Lexikon, 1981, vol. 2, p. 1230.
Ullmanns Encyklopadie der Technischen Chemie, 1972, vol. 2, pp. 295–299.

*Primary Examiner*—Allan M. Lieberman
*Attorney, Agent, or Firm*—Oblon, Spivak, McClelland, Maier & Neustadt

[57] ABSTRACT

Aqueous synthetic wax dispersions which contain, as an essential component of the solid substance, a partially or completely neutralized copolymer of a $C_2$–$C_4$-olefin and an unsaturated mono- or dicarboxylic acid or dicarboxylic anhydride are prepared by neutralizing and dispersing the solid substance in an aqueous medium at above the melting point of the copolymer, by a method in which the processes of neutralization and of dispersion are carried out in one extruder or in a plurality of extruders connected in series.

6 Claims, No Drawings

PREPARATION OF AQUEOUS SYNTHETIC WAX DISPERSIONS

The present invention relates to an improved process for the preparation of aqueous synthetic wax dispersions which contain, as an essential component of the solid substance, a partially or completely neutralized copolymer (I) which is composed of (A) a $C_2$-$C_4$-olefin and
(B) an unsaturated mono- or dicarboxylic acid or dicarboxylic anhydride or a mixture of these monomers, by neutralization and dispersion of the solid substance in an aqueous medium at above the melting point of the copolymer (I).

Since the solid substances of these dispersions are wax-like, they are referred to below as synthetic waxes or briefly as waxes. Correspondingly, as an essential component of the waxes, the copolymer (I) is defined as an E-AA wax, in accordance with the most well-known members of this class of substances, i.e. the completely or partially neutralized ethylene/acrylic acid copolymers.

The waxes are known to serve as preservatives, for example for protecting metallic and coated surfaces, and as floor care agents.

For the preparation of the E-AA waxes, ethylene and acrylic acid or methacrylic acid or other monomers of the components A and B are as a rule polymerized by the mass polymerization methods, after which some or all of the carboxyl groups of the resulting copolymer (I) are neutralized with a base. The E-AA waxes thus prepared have self-emulsifying properties and can therefore be converted into aqueous dispersions.

According to DE-A No. 35 12 564, dispersing is carried out in an emulsification autoclave. A temperature of from 140° to 160° C. and a pressure of from 4 to 6 bar are required for this purpose. The E-AA wax, as the starting material, is dispersed with the necessary amount of water, the corresponding amount of base and, if required, with assistants, under the abovementioned conditions, while stirring. After from 1 to 3 hours, the autoclave contents are cooled to room temperature with continued stirring, after which the prepared wax dispersion is discharged.

This process is very time-consuming and labor-intensive. Since the preparation of the ethylene copolymers is carried out most economically by continuous polymerization methods, as described in DE-A No. 34 20 168 and DE-A No. 35 12 564, the subsequent batchwise dispersing procedure represents a bottleneck, which has an adverse effect on the cost-efficiency of the overall process. Furthermore, the aqueous wax dispersions prepared by this process are subject to more or less pronounced quality fluctuations, which are unavoidable in batchwise production and are due mainly to different qualities of the starting materials and also to variations in the reaction conditions.

It is an object of the present invention to provide a process which gives the aqueous wax dispersions in constant product quality and in substantially shorter reaction times than in the emulsification autoclave.

We have found that this object is achieved by a process for the preparation of aqueous synthetic wax dispersions which contain, as an essential component of the solid substance, a partially or completely neutralized copolymer (I) which is composed of (A) a $C_2$- to $C_4$-olefin and
(B) an unsaturated mono- or dicarboxylic acid or dicarboxylic anhydride or a mixture of these monomers, by neutralization and dispersion of the solid substance in an aqueous medium at above the melting point of the copolymer (I), wherein the processes of neutralization and of dispersion are carried out in one extruder or in a plurality of extruders connected in series.

This procedure corresponds to a continuous method. It is noteworthy that the neutralization in an extruder takes place quantitatively even with residence times of only a few minutes, and that this time span is sufficient to obtain the desired finely divided and uniform dispersions.

According to Römpps Chemie-Lexikon, 8th edition, 1981, Vol. 2, page 1230, extrusion is a process for the production of tubes, filaments, profiles, hoses, etc. from thermoplastics. The apparatuses originally developed for this purpose are referred to as extruders, but they can also be used in areas other than plastics processing.

Extruders are conveying single-screw or multi-screw mixers. Since their mode of operation is based on the principle of the Archimedean screw, they are also frequently referred to as screw machines or screw presses. Ullmanns Encyklopädie der technischen Chemie, 4th edition, 1972, Vol. 2, pages 295-299 has introduced the term continuous mixer or continuous kneader as a general term. All extruder types mentioned there (with the exception of the Holo-Flite twin screws operating in an open trough) can be used for the novel process.

Specific examples are the following extruder single-screw mixers (extruders in the narrower sense), such as the Frenkel mixer, the plasticizer, the Votator or the Ko-kneader, continuous twin-screw mixers in which the screws rotate in the same direction, such as the Colombo screws or the ZSK screws, continuous twin-screw mixers in which the screws rotate in opposite directions, such as the Leistritz kneading pump, the Pasquetti twin screw, the Cotruder screws, the Kestermann twin screw, the Mapré twin screw, the Getecha kneader-extruder, the Welding Engineers machine, the Anger tandem extruder or the Zimmermann-Jansen extruder, continuous twin-screw kneaders, such as the Eck Mixtruder, the DSM mixer, the FCM kneader or the List all-phase apparatus, and continuous multi-screw apparatuses, such as the four- screw extruder or the planetary roller extruder.

In the novel process, continuous twin-screw mixers are preferred, particularly continuous twin-screw mixers in which the screws rotate in the same direction, such as the ZSK types from Werner & Pfleiderer or the ZE extruder from Berstorff.

The novel process permits a plurality of embodiments with the aid of one or more extruders connected in series. In the basic embodiment, the copolymer (I), in the form of granules, is metered into the cooled intake of the feed zone, which intake is advantageously blanketed with a stream of nitrogen, and is melted at extruder barrel temperatures above the melting point of the copolymer (I), preferably from 5° to 50° C. above the melting point of I, with the aid of, for example, kneading elements, backward-conveying elements, toothed disks and/or restrictors. Solid neutralizing agents are most advantageously metered into the polymer melt at the intake of the feed zone; in the case of liquid neutralizing agents, the point of addition is preferably a zone under reduced pressure, but the said neutralizing agents may also be added at the intake of the feed zone. In the extruder, the neutralization zone is followed by the dispersing zone. There, the desired amount of water is metered in, a zone under reduced pressure being preferred as the point of addition for the dispersant. The addition of further wax-like solid components in molten or dispersed form and/or of assistants is likewise preferably carried out in a zone under reduced pressure or at the intake of the feed zone.

In a modification of the embodiment described, the neutralizing agent and the dispersant can also be metered together into the intake of the feed zone. In this case, the neutralization zone and dispersing zone in the extruder are no longer separated spatially from one another.

In a particularly preferred embodiment, however, neutralizing and dispersing are carried out in one step directly in the extruder used to discharge the copolymer (I) from the polymerization reactor after its preparation. This is not only extremely economically advantageous but also dispenses with remelting of the copolymers (I), thus saving energy and avoiding additional thermal and mechanical stress on I. The discharge extruder of the polymerization reactor is not a special type of design but is determined only by its function as a discharge unit, in contrast to the reaction extruders, which can be operated independently.

The dispersing process can also be carried out in a second extruder which is located downstream of the extruder used for the neutralization. The first extruder may be the discharge extruder of the polymerization reactor.

The temperatures set inside the extruders which can be used for the novel process are usually from 70° to 200° C, the process preferably being carried out under autogenous pressure, for example from 1 to 40 bar.

The copolymers (I) used according to the invention and the E-AA waxes which can be prepared therefrom, and their aqueous dispersions, are essentially described in DE-A No. 34 20 168 and in DE-A No. 35 12 564.

Suitable components A for the synthesis of the copolymers (I) are ethylene, propylene, but-1-ene, but-2-ene, isobutene and mixtures of these olefins, ethylene being preferred. Suitable components B are, for example, acrylic acid, methacrylic acid, crotonic acid, isocrotonic acid, vinylacetic acid, maleic acid, maleic anhydride, fumaric acid, itaconic acid, itaconic anhydride and mixtures of these monomers; among these, acrylic acid, methacrylic acid and mixtures of these two monomers are preferred.

The carboxyl-containing ethylene copolymers preferably consist of from 75 to 95% by weight of ethylene and from 5 to 25% by weight of component B, the percentages being based on the acid form of the copolymers (I). Compositions consisting of from 78 to 88% by weight of ethylene and from 12 to 22% by weight of component B are particularly preferred. The ethylene copolymers in the acid form generally have a melt viscosity of not less than 1,000 mm$^2$/s, measured at 20° C., as the lower limit and a melt flow index (MFI) of not less than 1 g/10 min, measured at 125° C. and under a load of 325 g, as the upper limit.

The melting points of the copolymers (I) are, as a rule, from 70° to 105° C., polymers having melting points of from 75° to 90° C. being preferred.

Suitable bases for neutralizing the copolymers (I) are, for example, sodium hydroxide or potassium hydroxide in solid form or as a solution, ammonia, or an alkylamine which is unsubstituted or substituted by one or more hydroxyl groups, or mixtures of the stated compounds. Particularly suitable alkylamines are diethanolamine, triethanolamine, triisopropanolamine, 2-amino-2methylpropanol, dimethylethanolamine and diethylethanolamine. As a rule, the copolymers are 30–100% neutralized.

Waxes consisting of polyethylene oxidation products, polyethylene waxes and/or paraffins may be added as further wax-like solid components, in a total amount of not more than 80% by weight, based on the total amount of the solid substance of the dispersion. Typical waxes consisting of polyethylene oxidation products and suitable for the novel process have, as a rule, an acid number of from 18 to 25 and a molecular weight of from 2,000 to 10,000. They may be used in partially or completely neutralized form or may be partially or completely neutralized during the novel process. The polyethylene waxes which may be used preferably have a molecular weight of from 500 to 6,000 and a melting point of from 40° to 110° C., and the paraffins which can be used preferably have a melting point of from 40° to 100° C.

Advantageously, conventional assistants in small amounts may be added to the aqueous synthetic wax dispersions or to the components on which they are based. Suitable assistants are surfactants, ionic or nonionic emulsifiers, antifoams, such as ethylene oxide block polymers or propylene oxide polymers of fatty alcohols, diols, triols and ethylenediamines, leveling agents, such as fluorine-containing surfactants, for example the potassium salt of N-ethyl-N-perfluorooctanesulfonylglycine, corrosion inhibitors, for example N-(2-ethyl-hexyl)-succinic acid monoamide, N-(2-ethylhexyl)-phthalic acid monoamide, phenylsulfonylamidocaproic acid, diisobutenylsuccinic acid or medialanic acid, and/or permanent or temporary plasticizers, for example methyldiglycol or tributoxyethyl phosphate.

Preferably used dispersants for the E-AA waxes are water or mixtures of water and one or more alcohols. The solids content of the synthetic wax dispersions is preferably from 10 to 65% by weight and the mean particle size is, as a rule, from 0.05 to 0.3 μm.

The novel process is notable for the constant product quality of the resulting aqueous synthetic wax dispersions and in particular by the time saved in the continuous operation of the extruder. In contrast to the batchwise autoclave process, in which the desired finely divided and uniform dispersions of the E-AA waxes are obtained only after 1 hour at the earliest, the residence time in the extruder amounts to only a few minutes and in many cases 2 minutes or even less.

EXAMPLES

In Examples 1 to 4 below, a twin-screw extruder in which the screws rotate in the same direction (Type ZSK 57 from Werner & Pfleiderer) was used, the said extruder having a 1.50 m long mixing zone and a diameter of 5.7 cm. In Example 5, a twin-screw extruder in which the screws rotate in the same direction (Type ZSK 90 from Werner & Pfleiderer) was used, the said extruder having a 1.40 m long mixing zone and a diameter of 9.0 cm.

EXAMPLE 1

35 kg/hour of an E-AA wax in the form of granules, consisting of 79% by weight of ethylene and 21% by weight of acrylic acid and having a melting point of 84°

C. and an MFI of 3 g/10 min (measured at 125° C. and under a load of 325 g), were metered into the nitrogen-blanketed intake of the feed zone of the extruder and melted there at 110° C. Downstream of a melting zone of 0.50 m, 6.25 kg/hour of a 25% strength by weight aqueous ammonia solution were pumped in; the pressure in the extruder at this point was about 2 bar, the maximum pressure in the extruder being about 30 bar. In the downstream neutralization zone, a temperature of 100° C. was maintained; the maximum temperature in the extruder was 140° C. After a mixing zone of 0.85 m (measured from the feed zone), 99 kg/hour of water preheated to 90° C. were pumped in; the pressure in the extruder at this point was about 4 bar. The homogeneous dispersion discharged from the extruder had a mean particle size of 0.1 μm. The mean residence time in the extruder was 2 minutes.

The dispersion prepared is very suitable for preserving coating films and for the production of floor care agents.

EXAMPLE 2

The procedure described in Example 1 was followed, but in addition 140 kg/hour of a paraffin having a melting range of from 44° to 46° C. and a molecular weight of 6,000 were metered in molten form into the feed zone of the extruder. The paraffin contained 0.25% by weight of a fluorine-containing surfactant as leveling agent. The resulting homogeneous dispersion had a mean particle size of 0.25 μm. The mean residence time in the extruder was 2 minutes.

The dispersion prepared is very suitable for preserving coated metals from corrosion.

EXAMPLE 3

50 kg/hour of an E-MAA wax in the form of granules, consisting of 76% by weight of ethylene and 24% by weight of methacrylic acid and having a melting point of 79° C. and an MFI of 3 g/10 min (measured at 150° C. and under a load of 325 g), were metered together with 5.5 kg/hour of sodium hydroxide pellets into the nitrogen-blanketed intake of the feed zone of the extruder and melted there at 110° C. After a melting zone of 0.50 m, 5 kg/hour of water were pumped in; the pressure in the extruder at this point was about 2 bar, the maximum pressure in the extruder being about 25 bar. In the downstream neutralization zone, a temperature of 100° C. was maintained; the maximum temperature in the extruder was 140° C. After a mixing zone of 0.85 m (measured from the feed zone), 139.5 kg/hour of water preheated to 90° C. were pumped in; the pressure in the extruder at this point was about 3.5 bar. The homogeneous dispersion discharged from the extruder had a mean particle size of 0.15 μm. The mean residence time in the extruder was 2 minutes.

The dispersion prepared is very suitable for preserving coating films and floor coverings.

EXAMPLE 4

The procedure described in Example 1 was followed, except that, instead of the aqueous ammonia solution, dimethylethanolamine in an amount of 9 kg per hour was used for the neutralization. The resulting homogeneous dispersion had a mean particle size of 0.08 μm. The mean residence time in the extruder was 2 minutes.

The dispersion prepared is very suitable for preserving coating films and floor coverings.

EXAMPLE 5

144 kg/hour of a molten E-AA wax consisting of 80% by weight of ethylene and 20% by weight of acrylic acid and at 180° C. were metered from the product separator of the reactor into the intake of the feed zone of the discharge extruder of a continuous high pressure polymerization reactor. After a mixing zone of 0.25 m, 35 kg/hour of dimethylethanolamine were pumped in; the pressure in the extruder at this point was about 1.5 bar, the maximum pressure in the extruder being about 30 bar. In the downstream neutralization zone, a temperature of 100° C. was maintained; the maximum temperature in the extruder was 140° C. After a mixing zone of 0.45 m (measured from the feed zone), 400 kg/hour of water preheated to 90° C. were pumped in; the pressure in the extruder at this point was about 3.5 bar. The homogeneous dispersion discharged from the extruder had a mean particle size of 0.11 μm. The mean residence time in the extruder was 1.5 minutes.

The dispersion prepared is very suitable for preserving coating films and floor coverings.

We claim:

1. A process for the preparation of an aqueous synthetic wax dispersion having a mean particle size of from 0.05 to 0.3 μm which contain, as an essential component of the solid substance, a partially or completely neutralized copolymer (I) which is composed of
   (A) 75–95% of a $C_2$–$C_4$-olefin and
   (B) 5–25% by weight of an unsaturated mono- or dicarboxylic acid or dicarboxylic anhydride or a mixture of these monomers, by neutralization and dispersion of the solid substance in an aqueous medium at above the melting point of the copolymer (I), wherein the processes of neutralization and of dispersion are carried out in one extruder or in a plurality of extruders connected in series.

2. A process as claimed in claim 1, wherein the preparation of the dispersion is carried out in the extruder used for discharging the copolymer (I) from the polymerization reactor after its preparation, and further solid components, assistants or a mixture thereof may be incorporated.

3. A process as claimed in claim 1, wherein the copolymer (I) is composed of from 75 to 95% by weight of ethylene as component A and from 5 to 25% by weight of component B, the percentages being based on the acid form of I.

4. A process as claimed in claim 1, wherein the copolymer (I) has a melting point of from 70° to 105° C.

5. A process as claimed in claim 1, wherein the solid substance of the dispersion contains, in addition to the copolymer (I) according to the definition, not more than 80% by weight of a wax consisting of polyethylene oxidation products, a polyethylene wax, a paraffin or a mixture thereof, the percentage being based on the total amount of the solid substance of the dispersion.

6. A process as claimed in claim 3, wherein the solid content of the aqueous synthetic wax dispersion is from 10–65% by weight.

* * * * *